T. BARNES.
CUSHION TIRE.
APPLICATION FILED MAY 3, 1916.
1,203,458.
Patented Oct. 31, 1916.
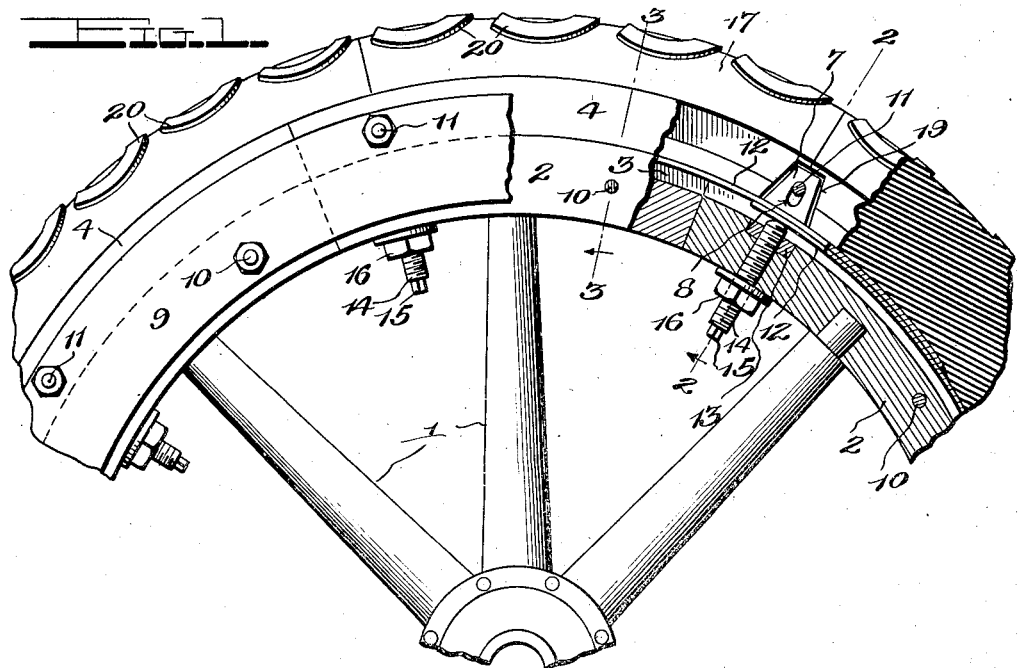
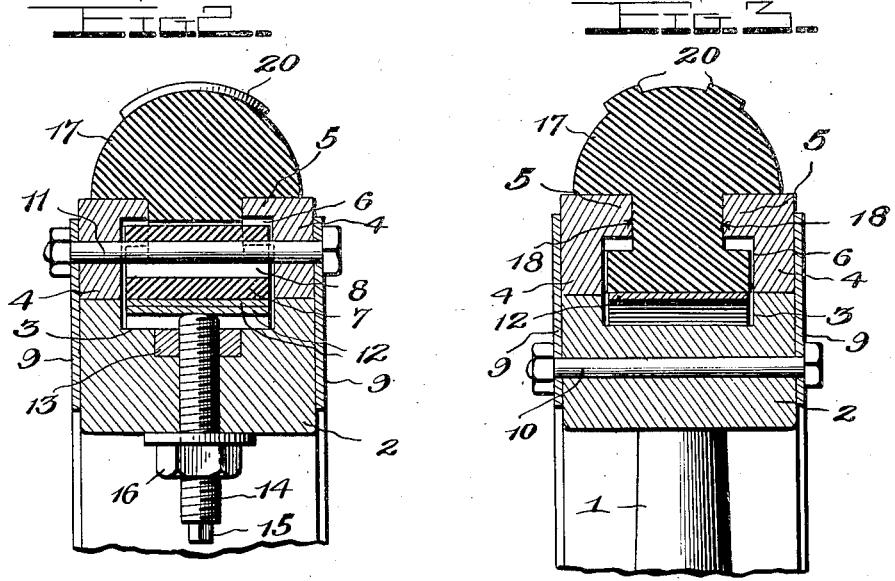
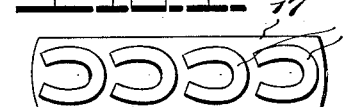
Witness
Chas. L. Griestaur.
Inventor
Thomas Barnes,
By E. B. McBath
Attorney

UNITED STATES PATENT OFFICE.

THOMAS BARNES, OF DENVER, COLORADO.

CUSHION-TIRE.

1,203,458. Specification of Letters Patent. Patented Oct. 31, 1916.

Application filed May 3, 1916. Serial No. 95,142.

*To all whom it may concern:*

Be it known that I, THOMAS BARNES, a citizen of the United States, residing at Denver, in the county of Denver and State of Colorado, have invented certain new and useful Improvements in Cushion-Tires, of which the following is a specification.

This invention relates to a cushion tire for automobiles and other vehicles adapted for road use, and the object of the invention is to produce a tire of this type which can be adjusted and held in perfect circular, or true form, and in which a badly worn, cut or otherwise damaged section can be removed and a new one replaced, thereby avoiding the necessity of purchasing an entire new tire.

With these objects in view the invention consists of the features of construction hereinafter described, pointed out in the claims, and shown in the accompanying drawings, in which:—

Figure 1 is a side sectional elevation of a portion of a wheel provided with my tire. Fig. 2 is a section on the line 2—2 of Fig. 1. Fig. 3 is a section on the line 3—3 of Fig. 1. Fig. 4 is a plan view of a portion of the tire tread.

It will be understood that the wheel proper may be either of wood or metal, or a combination of the two. I have illustrated the invention as applied to a wheel having spokes 1 and a wood rim 2, preferably formed in sections. The rim so formed is circumferentially grooved as at 3. Fitted on said rim and on opposite sides of said groove are circular plates 4, also formed in sections, and having inwardly extending flanges 5 which overhang, but are spaced from, the groove 3. At certain points these flanges are undercut or recessed as at 6, Fig. 2, and fitting in said recesses and extending transversely across the groove 3 are rubber blocks 7 having a bore 8 therethrough, which is oblong in cross section. Metal plates 9 are secured to the outer faces of the rim and to the plates 4 by bolts 10 which pass through the rim 2 and bolts 11 which pass through the plates 4 and the bore 8 of the blocks 7. A flat spring 12 of greater length than the circumference of the wheel rim is seated in the groove 3, its ends being left free and overlapping, as shown in Figs. 1 and 2. Nuts 13 are sunk in the bottom of the groove 3 and preferably immediately beneath the blocks 7. Working through the rim and through said nuts and bearing on the underface of the spring 12 are screws 14, and their outer ends are squared so that they may be turned by a wrench, as indicated at 15. Lock nuts 16 are placed on the screws and bear against the inner face of the rim 2. A cushion tire, made in sections is channeled out on the sides as at 18 to receive the flanges 5 of the plates 4. The ends of the tire sections are undercut as at 19 to fit the blocks 7. The tread of the tire 17 has molded upon it in relief, a horseshoe design as shown at 20, which serves to prevent skidding of the wheel. The various tire sections when in position are vulcanized together, but any damaged section can be quickly cut out and a new section inserted and vulcanized in place.

The oblong bores of the blocks 7 permit radial movement of said blocks under pressure from the spring 12 which supports them. By loosening the nuts 16 and turning the screws 14, or any desired number of them, the spring 12 can be forced outwardly, thus truing any particular worn section of the tire. It is by means of this adjustment of the spring support for the cushion tire that I am able at all times to keep the tire a perfect circle. The blocks 7 not only distribute the pressure of the spring 12 uniformly and in the proper direction upon the end portions of the tire sections, but they also, by receiving the bolts 11 make it unnecessary to form any openings in the tire proper. They also perform another important function.

After the meeting ends of the tire sections have been vulcanized the tread portion of the tire acts substantially as though it had not been formed in sections. In all tires of this kind there is while they are in use a constant stretching of the tread portion due to friction with the ground. This stretching does not extend entirely to the base of the tire, and the effect of it decreases with the distance from the exterior surface. This results in a tendency to pull the surface portion from the base portion, in what might be termed a "creeping" action of the tire surface resulting in a buckling of the tire. By inserting the blocks 7 they form practically loose joints, the surface or tread portion of the tire being continuous but not the base portion. This loose joint therefore serves to take up this slack due to the minute stretching of the outer tread portion with reference to the base of the tire sections. The advantages of such a support, especially for heavy trucks, and this adjustable feature will be obvious to those having had experience in the use of such tires. It is also designed to provide sections of different thicknesses, so that when a wheel has worn down and a damaged section is to be replaced it can be done with one slightly less in thickness, say one-fourth of an inch, than the original sections.

The device may be applied to any wheel now in use by boring openings for the bolts 10, 11, using the groove for the present pneumatic tire for the spring 12, and by inserting the nuts 13 with bores of the screws 14. It will also be borne in mind that adjustment by the screws is possible only when the nuts on the bolts 10 and 11 are loosened up for the section or sections to be adjusted.

What I claim is:—

1. In a device of the kind described, a wheel having a grooved rim, a spring arranged in said goove and having loosely overlapping end portions, plates arranged on said rim and on opposite sides of the groove, means for securing the plates to the rim, elastic blocks arranged between the plates and across said groove, bolts passing through the plates and longitudinally through the blocks, said blocks having a limited movement relative to the bolts, a tire held between the plates and having its base recessed to receive said blocks, and means for applying outward pressure to the spring at points beneath said blocks.

2. In a device of the kind described, a wheel having a circumferentially grooved rim, plates mounted on the rim and on opposite sides of the groove and inwardly flanged, said flanges being recessed at predetermined points, elastic blocks extending across the groove and having their ends engaging the flange recesses, said blocks having an oblong cross sectional bore, bolts extending through the plates and through the bores of the blocks, a tire having cut out portions in its base to receive said blocks, and channeled on the sides to receive said flange, a spring band having loose overlapping ends, said band working in the groove, and screws working through the rim and bearing on said band at points opposite the elastic blocks.

In testimony whereof I affix my signature.

THOMAS BARNES.